United States Patent [19]

Ogura et al.

[11] Patent Number: 4,758,012

[45] Date of Patent: Jul. 19, 1988

[54] STEERING SYSTEM FOR A VEHICLE WITH STEERABLE FRONT AND REAR WHEELS

[75] Inventors: Masami Ogura; Yasuharu Oyama; Toru Yasuda; Masaru Abe; Yoshimichi Kawamoto; Tsuyoshi Sato, all of Saitama, Japan

[73] Assignee: Honda Giken Kogyo Kabushiki Kaisha, Tokyo, Japan

[21] Appl. No.: 10,177

[22] Filed: Feb. 2, 1987

[30] Foreign Application Priority Data

Feb. 3, 1986 [JP] Japan ................................. 61-21625
Feb. 3, 1986 [JP] Japan ................................. 61-21626

[51] Int. Cl.$^4$ ............................................. B62D 5/06
[52] U.S. Cl. ..................................... 280/91; 267/150; 180/143
[58] Field of Search ........................ 280/91; 267/150; 180/143

[56] References Cited

U.S. PATENT DOCUMENTS

| 4,313,514 | 2/1982 | Furukawa et al. | 180/143 |
| 4,506,899 | 3/1985 | Sand et al. | 280/91 |
| 4,572,316 | 2/1986 | Kanazawa et al. | 280/91 |

*Primary Examiner*—Kenneth R. Rice
*Attorney, Agent, or Firm*—Irving M. Weiner; Joseph P. Carrier; Pamela S. Burt

[57] ABSTRACT

A steering system for a vehicle having a steering wheel, steerable front wheels and steerable rear wheels. The system comprises a linkage arrangement operatively interconnecting the steering wheel with the front and rear wheels for steering the front and rear wheels in response to operation of the steering wheel. The linkage arrangement includes a mechanical linkage mechanically connected with the steering wheel so as to transmit steering effort. The mechanical linkage is provided with a restoring mechanism for exerting restoring force to said mechanical linkage so as to urge the steering wheel toward a neutral position thereof. Favorable returnability of the steering system is achieved in this arrangement.

17 Claims, 8 Drawing Sheets

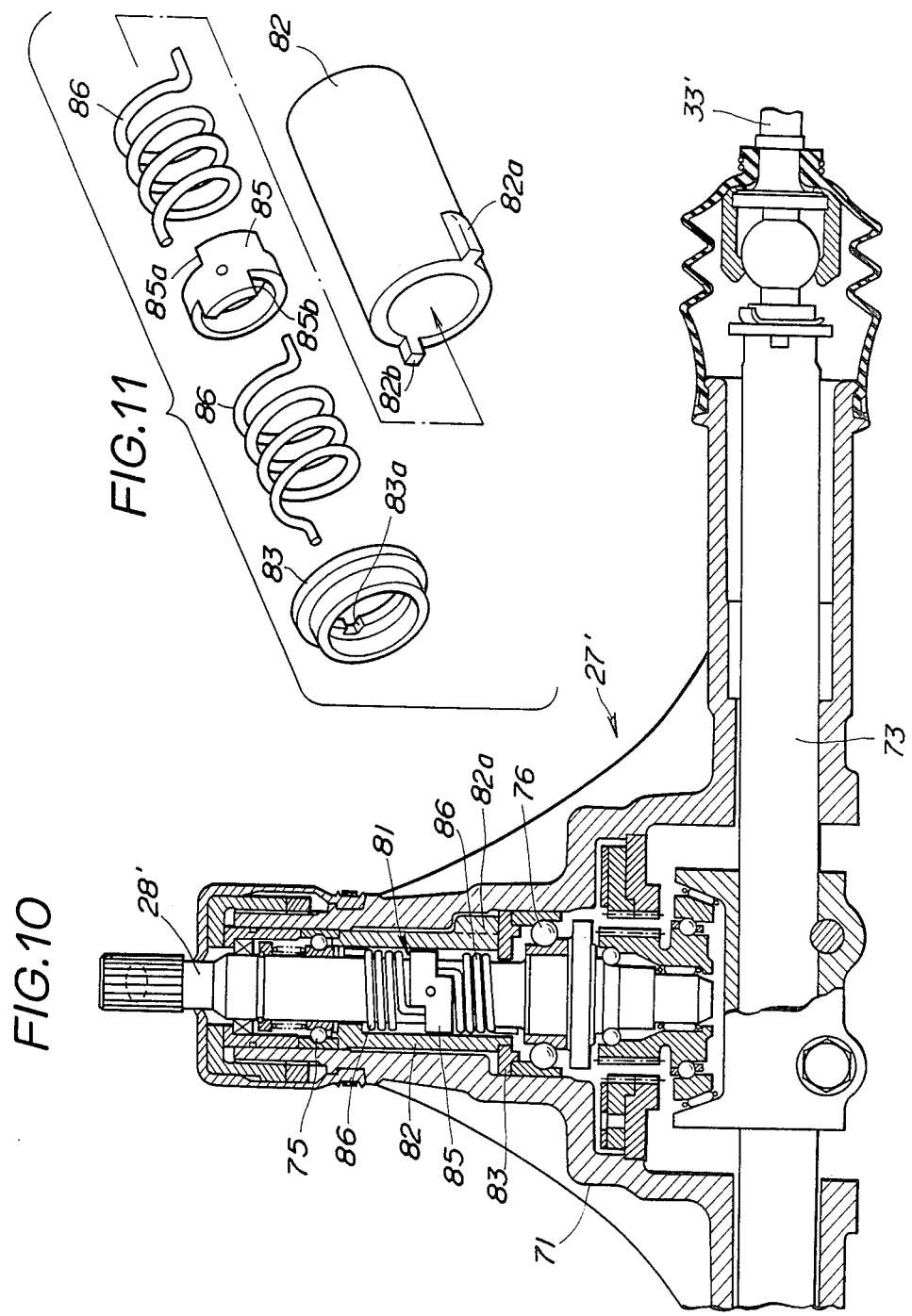

STEERING SYSTEM FOR A VEHICLE WITH STEERABLE FRONT AND REAR WHEELS

BACKGROUND OF THE INVENTION

1. Field of the Invention

The present invention relates to a steering system for a vehicle with steerable front and rear wheels.

2. Description of Relevant Art

There have been known various conventional steering systems for road vehicles, such as automobiles, having steerable front and rear wheels. Some of such steering systems permit a specific steering operation mode in which the front wheels and the rear wheels may be selectively steered in the same direction and in opposite directions, depending on certain running conditions of the vehicle. For example, Furukawa et al U.S. Pat. No. 4,313,514 discloses steering systems for steering the rear wheels in the same direction as the front wheels when the vehicle speed is relatively high and in the direction opposite to that of the front wheels when the vehicle speed is relatively low, so as to provide favourable steering characteristics of the vehicle. Sano et al U.S. Pat. No. 4,506,899 discloses another steering system, which steers the rear wheels in the same direction as the front wheels when the amount of rotation of the steering wheel from its neutral position is relatively small and in the opposite direction when such amount of rotation is relatively large.

When a vehicle with such steering system makes a turn with the front and rear wheels being steered in the same direction, the turning radius of the vehicle will be so large that the vehicle proceeds obliquely with its movement being nearly a translation. This results into a small lateral acceleration of the vehicle caused by a small centrifugal force during a turn.

Generally, lateral accelerations of a vehicle considerably affect the returnability of the vehicle. The returnability is the tendency of the road wheels to return to the straight-ahead position, or, the tendency of the steering wheel to return its neutral position. The lateral acceleration is caused by the road resistance applied to the tires in lateral direction (sometimes called side force to the tires), which is transmitted through the steering linkage to the steering wheel as a torque to urge the steering wheel to its neutral position. The torque is perceived by the driver as a returning torque of the steering wheel. Thus, the lateral acceleration has direct effects over the returnability, though there are various other factors which have effects over it. In almost every road vehicle, the returning torque occurs on their steering wheels and substantially affects the operation feelings of the steering wheel.

In a conventional vehicle having a steering system of the aforementioned type, however, it is difficult to provide optimum operation feelings of the steering wheel because small lateral accelerations in a turn, under the condition that the front and rear wheels are steered in the same direction, often result in an insufficient returning torque of the steering wheel.

SUMMARY OF THE INVENTION

An object of the present invention is to provide a steering system for a vehicle having a steering wheel and steerable front and rear wheels, wherein the steering system provides optimum operation feelings of the steering wheel.

Another object of the invention is to provide a steering system for a vehicle having a steering wheel and steerable front and rear wheels, wherein the steering system achieves an optimization of returning torque of the steering wheel.

According to the invention, a steering system is provided for a vehicle having a steering wheel, steerable front wheels and steerable rear wheels. The steering system comprises linkage means for operatively interconnecting the steering wheel with the front and rear wheels for steering the front and rear wheels in response to operation of the steering wheel. The linkage means comprises a mechanical linkage mechanically connected with the steering wheel so as to transmit steering effort. The mechanical linkage is provided with restoring means for exerting restoring force to the mechanical linkage so as to urge the steering wheel toward a neutral position thereof.

The above and further objects, features and advantages of the present invention will become apparent from the following detailed description of the preferred embodiments thereof, when taken in conjunction with the accompanying drawings.

BRIEF DESCRIPTION OF THE DRAWINGS

FIG. 10 is a sectional view of a rear steering gear used in the steering system of a third embodiment of the invention, showing a restoring mechanism associated with and disposed in the rear steering gear.

FIG. 11 is a perspective view showing components of the restoring mechanism of FIG. 10.

DETAILED DESCRIPTION OF THE PREFERRED EMBODIMENTS

Figure 1:
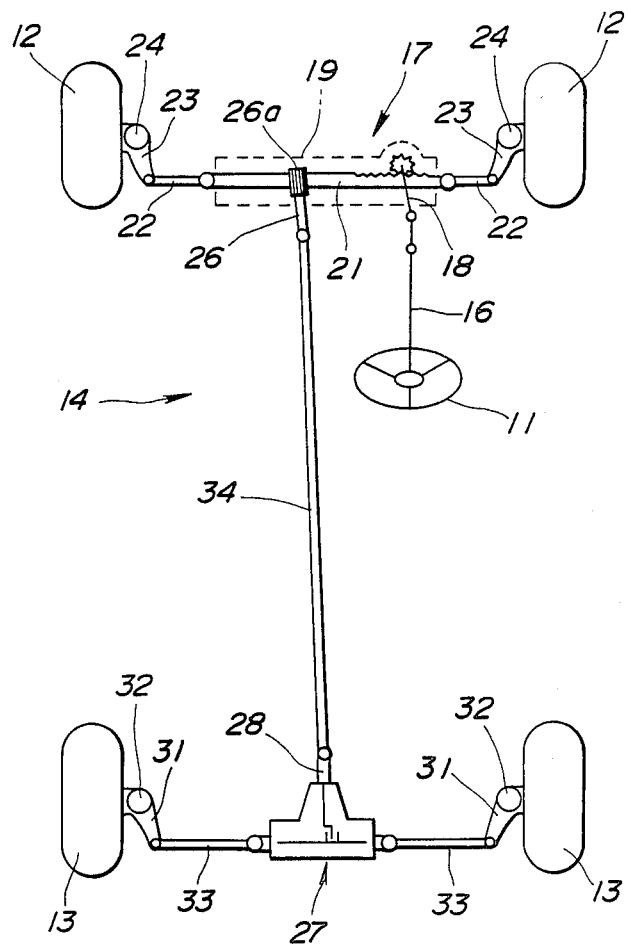
FIG. 1 is a simplified schematic plan view of the entire steering system of a first embodiment of the present invention.
Figure 2:
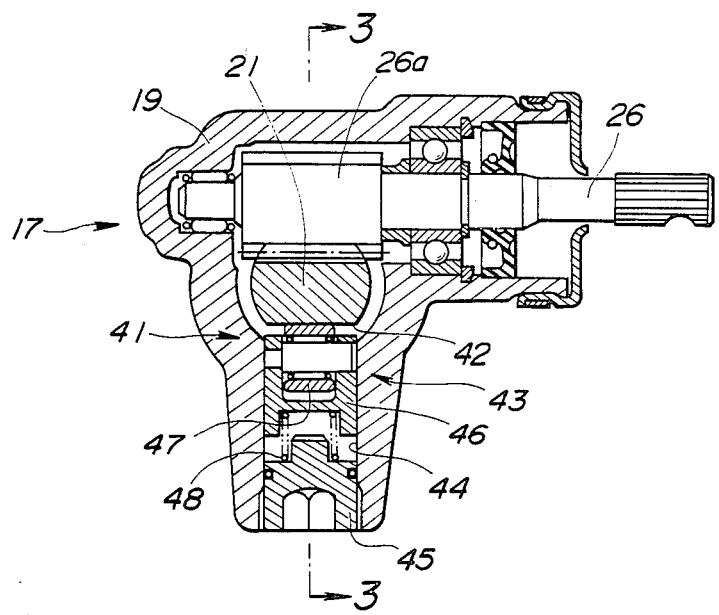
FIG. 2 is a sectional view of a front steering gear used in the steering system of FIG. 1, showing a restoring mechanism in the front steering gear.
Figure 3:
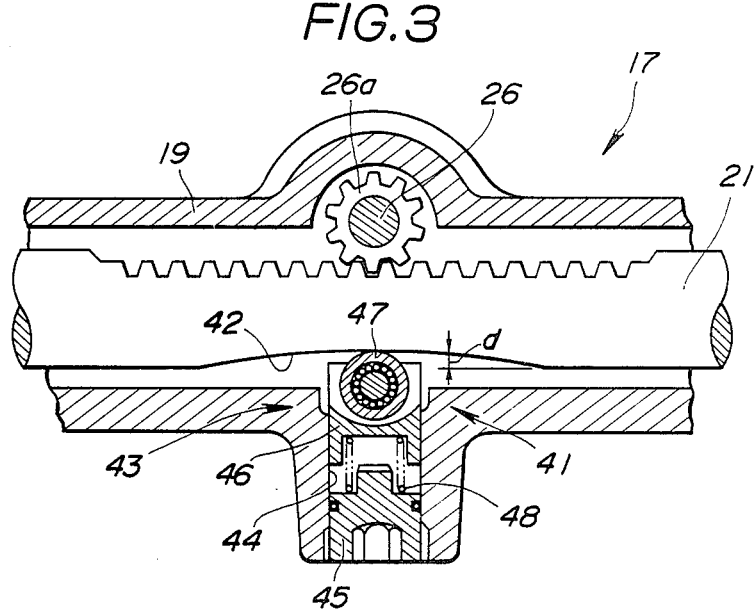
FIG. 3 is a sectional view, showing the restoring mechanism of FIG. 2, taken along line 3—3 in FIG. 2.

FIGS. 1 to 3 shows a steering system of the first embodiment of the invention. Referring to FIG. 1, a vehicle, as illustrated schematically, has a steering wheel 11, front wheels 12 and rear wheels 13. The front and rear wheels are steerably supported on a frame of the vehicle by means of conventional suspension structures using steering knuckles 24 and 32. The steering system includes a linkage arrangement 14 having a mechanical construction and interconnecting the steering wheel 11 with the front wheels 12 and rear wheels 13. Elements of the steering system described below are supported on the vehicle frame through appropriate supports, which have conventional structures and are therefore not described herein in detail. The steering wheel 11 is secured to one end of a rotatable steering shaft 16, the other end of which is connected, through a coupler, with an input shaft 18 of a front steering gear 17 for the front wheels 12. The front steering gear 17 is of the rack-and-pinion type, and the input shaft 18 is a pinion shaft having a pinion at one end. A gear box 19 of the front steering gear 17 supports an axially movable rack 21 which has both ends connected with respective arms 23 of the steering knuckles 24 through tie rods 22. Each steering knuckle 24 carries a spindle for the front wheel 12. The rack 21 has two rows of teeth. The first of the teeth engages the pinion on the input shaft 18, so that the rack 21 is mechanically connected with the steering wheel 11 so as to transmit steering effort from the steering wheel. As this arrangement of the first row of teeth and the input shaft 18 is utilized in a conventional rack-and-pinion steering gear, it is not shown in the drawings. The front steering gear 17 has a second pinion shaft 26 which is rotatably supported by the gear box 19, extends longitudinally of the vehicle and has a pinion 26a at the front end. The pinion 26a engages the second of the row of teeth on the rack 21 as shown in FIGS. 2 and 3, whereby straight-line motion of the rack 21 is converted into rotary motion of the second pinion shaft 26.

The linkage 14 further includes a rear steering gear 27 for the rear wheels 13. Many types of rear steering gears, such as those disclosed in Furukawa U.S. Pat. No. 4,406,472, Sano et al U.S. Pat. No. 4,506,899 and Furukawa et al U.S. Pat. No. 4,538,824, may be used for the rear steering gear 27. There are also many other types of known steering gears which can be used for this purpose. Detailed description of the rear steering gear is unnecessary for this embodiment, and its general construction only is described herein. As shown in FIG. 1, the rear steering gear 27 has a rotatable input shaft 28 which is interconnected with the second pinion shaft 26 of the front steering gear through a longitudinal connecting shaft 34 and couplers at the ends of the shaft 34. The rear steering gear 27 is connected with arms 31 of the steering knuckles 32 through tie rods 33. Each steering knuckle 32 carries a spindle for the rear wheel 13. The arrangement of the rear steering gear is such that it cooperates with the front steering gear to steer the rear wheels 13 in the same direction as the front wheels 12 when the amount of rotation of the steering wheel 11 from its neutral position is relatively small, and to steer the rear wheels 13 in the opposite direction as that of the front wheels 12 when the amount of rotation is relatively large. It is noted that both the front wheels 12 and the rear wheels 13 are mechanically and operationally connected with the steering wheel through the linkage arrangement 14.

According to the invention, the steering system is provided with a restoring mechanism. As shown in FIGS. 2 and 3, The gear box 19 of the front steering gear 17 contains a restoring mechanism 41 which comprises a concave cam surface 42 formed on the rack 21 and a roller assembly 43 mounted in the gear box 19 and normally urged toward the cam surface 42. The cam surface 42 is formed on a side of rack 21 which is diametrically opposite to the second row of teeth. Further, the cam surface has a shape wherein the depth d of the concave surface varies along the axial direction of the rack 21 with the maximum value of depth d being at the center of the cam surface. The roller assembly 43 faces this center of the cam surface when the front steering gear is at its neutral position. The gear box 19 has a vertical guide hole 44 for the roller assembly 43 just under the pinion 26a of the second pinion shaft 26. The lower end of the guide hole 44 is closed by a plug 45 forming the bottom of the hole 44. The roller assembly 43 comprises a slider 46 slidable axially in the guide hole 44 and a roller 47 attached on the slider 46 through a bearing. A coil spring 48 is provided between the slider 46 and the plug 45 for urging the slider 46 upwardly to cause the roller 47 to engage the cam surface 42. The roller 47 is so oriented as to roll smoothly on the cam surface 42 when the rack 21 moves axially.

In this arrangement of the restoring mechanism 41, when the steering wheel 11 is operated away from its neutral position the roller 47 will be in engagement with the cam surface at some position other than the center of the cam surface, whereby the force exerted by the roller on the cam surface urges the rack 21 toward its neutral position. Thus, restoring force is exerted on the rack 21. The rack 21, the input shaft 18 and the steering shaft 16 constitute a transmission path of steering effort, through which the restoring force is transmitted to the steering wheel 11 to urge it toward its neutral position. Accordingly, the restoring mechanism provides the returnability, or the assistance of the returnability, for the steering system. Since the restoring force depends on the stiffness of the spring 48 and the inclination of the cam surface, it is possible to enhance or advantageously and desirably supplement the returnability of the steering system by appropriately designing or varying these factors.

Figure 4:
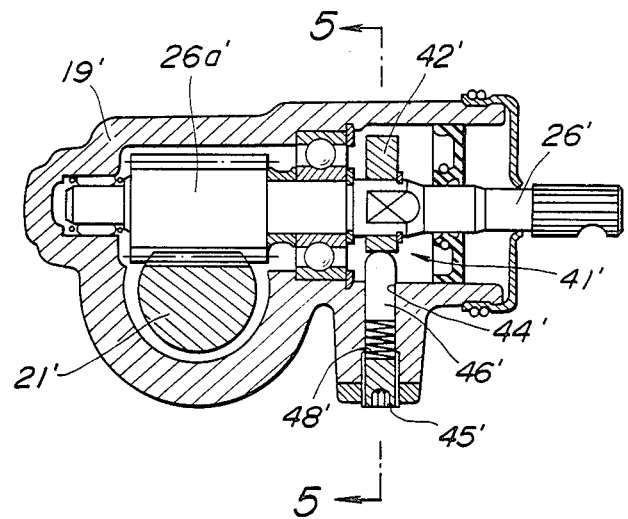
FIG. 4 is a sectional view of a modified front steering gear for the system of FIG. 1, showing an alternative of the restoring mechanism of FIG. 2.
Figure 5:
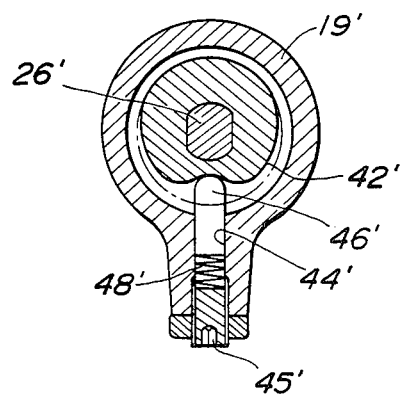
FIG. 5 is a sectional view, showing the restoring mechanism of FIG. 4, taken along line 5—5 in FIG. 4.

FIGS. 4 and 5 show a modified restoring mechanism 41' which may be used as an alternative to the restoring mechanism 41 of FIGS. 2 and 3 described above. For an easier understanding, similar or corresponding elements are designated by the corresponding reference numerals with apostrophes (') affixed. Though the front steering gear should be somewhat modified to be adapted to this modified mechanism 41', the required modification will be readily understood by an artisan referring to the following description of the mechanism 41'. The front steering gear has a gear box 19', a rack 21' and a second pinion shaft 26' all of which are similar to but slightly different from those mentioned with reference to FIG. 1. The rack 21' has, however, no cam surface thereon. Instead the mechanism 41' uses a cam 42' which has a heart-like shape and is sometimes called heart cam. The cam 42' is secured to the neck of the second pinion shaft 26' such that a recess on the periphery of the cam is positioned just under a pinion 26a' of the second pinion shaft 26' when the front steering gear is at its neutral position. In FIG. 5, a circle having a radius equal to the maximum radius of the cam and a center concentric with the cam is shown by dot-and-dash lines to clarify the shape of the cam. The gear box 19' has a vertical guide hole 44' for a slider 46' which is axially slidable in the guide hole 44'. The guide hole 44' has a lower end closed by a plug 45'. A coil spring 48' is provided between the slider 46' and the plug 45' for urging the slider 46' upwardly to cause engagement between the slider and the periphery of the cam. The upper end, or top, of the slider 46' is finished into a smooth surface, so that it may be in sliding contact with the periphery of the cam while causing little friction.

In this arrangement of the restoring mechanism 41', when the steering wheel 11 is operated away from its neutral position the slider will be in engagement with the periphery of cam 42 at some position with inclined periphery, i.e., such a position where the normal line of the periphery will not pass the center of the cam, whereby the slider exerts a restoring force to the cam, and thus to the second pinion shaft 26'. The second pinion shaft 26', the rack 21', the input shaft of the steering gear and the steering shaft for the steering wheel constitute a transmission path of steering effort, through which the restoring force is transmitted to the steering wheel. Thus, the restoring mechanism 41' functions to urge the steering wheel toward its neutral or center position.

It will be understood that an active range of the restoring mechanism depends on the contour of the concave cam surface 42 on the rack 21 on the contour of the heart cam 42', in the steering systems mentioned above. The active range may be advantageously defined as follows. Initially, according to the steering system having the aforementioned arrangements, the rear wheels 13 are steered in the same direction as the front wheels 12 only when the amount of rotation of the steering wheel 11 is relatively small. Thus, when the steering wheel is turned with a relatively large rotation and the rear wheels are steered in the opposite direction to that of the front wheels, the returnability which is inherent to the steering system, i.e., not generated by the restoring mechanism, is not so small that the returnability assistance provided by the restoring mechanism is necessarily required. Therefore, designing the contour of the cam surface or the heart cam such that the restoring mechanism is only active within the range where the amount of rotation of the steering wheel is relatively small, would provide smooth operation feelings of the steering wheel in many cases.

Figure 6:
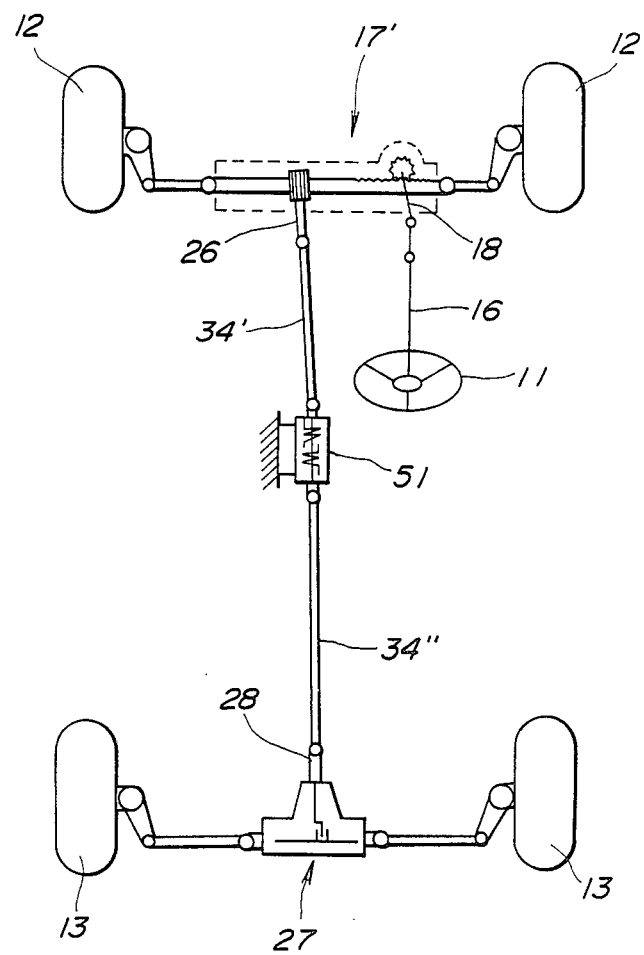
FIG. 6 is a simplified schematic plan view of the entire steering system of a second embodiment of the invention.
Figure 7:
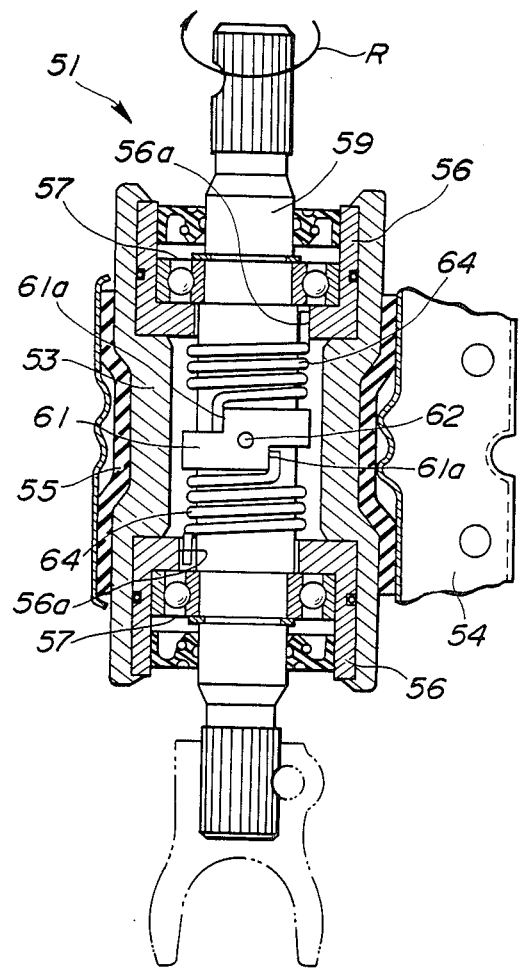
FIG. 7 is a sectional view of a restoring mechanism unit used in the steering system of FIG. 6.

FIGS. 6 and 7 show the steering system of the second embodiment of the invention. This embodiment is different from the first embodiment in some points, which are described below. However, the second embodiment uses the same structures as those in the first embodiment in many parts, and the same structures are not described herein in detail. Elements of the second embodiment corresponding to those of the first embodiment will be designated by the corresponding reference numerals.

As shown in FIG. 6, the second embodiment includes a front steering gear 17' for front wheels 12 which has a first pinion shaft 18 and a second pinion shaft 26, a rear steering gear 27 for rear wheels 13 which has a rotatable input shaft 28, and a connecting linkage which has a mechanical construction and interconnects the front and rear steering gears with each other so as to constitute a transmission path of steering effort. The rear steering gear 27 has a structure identical with that of the first embodiment. The front steering gear 17' is the same in structure as that described with reference to FIGS. 1 to 3 except that it contains no restoring mechanism. The connecting linkage comprises a front longitudinal shaft 34' coupled at its front end to the second pinion shaft 26 of the front steering gear through a coupler, a rear longitudinal shaft 34" coupled at its rear end to the input shaft 28 of the rear steering gear through a coupler, and a restoring mechanism unit 51 disposed between and interconnecting these longitudinal shafts 34' and 34".

As shown in FIG. 7, the restoring mechanism unit 51 has a casing 53 of a generally cylindrical shape supported by a bracket 54 secured to a part of the vehicle frame, with a rubber bushing 55 between the casing 53 and the bracket 54. A pair of cups 56 are fitted in the casing at respective ends of the casing and secured thereto. Each cup 56 contains a bearing 57 and a seal member. The bearings 57 support a rotatable shaft 59, the ends of which are adapted for connection to the front and rear longitudinal shafts, respectively, through appropriate couplers. (A part of one of the couplers is shown in FIG. 7 by imaginary lines.) At the center of the shaft 59 is secured, through a pin 62, a collar 61 which has steps 61a on respective sides. The shape of this collar 61 is the same as a collar 85 shown in FIG. 11 which is used in the third embodiment described hereinbelow. The unit 51 includes a pair of coil springs 64 each of which is disposed between the collar 61 and a respective one of the cups 56. Also, each coil spring 64 is fitted over the shaft 59 and has one end engaging a cut-out 56a defined in the cup 56 and the other end engaging the step 61a of the collar 61. The coil springs 64 may be or may not be preloaded when the unit is assembled, depending on the desired returnability of the vehicle. In the case with no preloading, when the steering wheel is operated so as to cause rotation of the shaft 59 from its neutral position in the direction as indicated by arrow R in FIG. 7 one coil spring (the upper one in FIG. 7) will be wound up, while the other coil spring will not be affected or deformed. Further, when the shaft 59 is rotated in the opposite direction from its neutral position, the lower coil spring in FIG. 7 will be wound up, and the upper coil spring in FIG. 7 will not. The wound up coil spring exerts restoring torque to the shaft 59, which torque is transmitted to the steering wheel 11 (FIG. 6) to urge it toward its neutral or central position.

Figure 8:
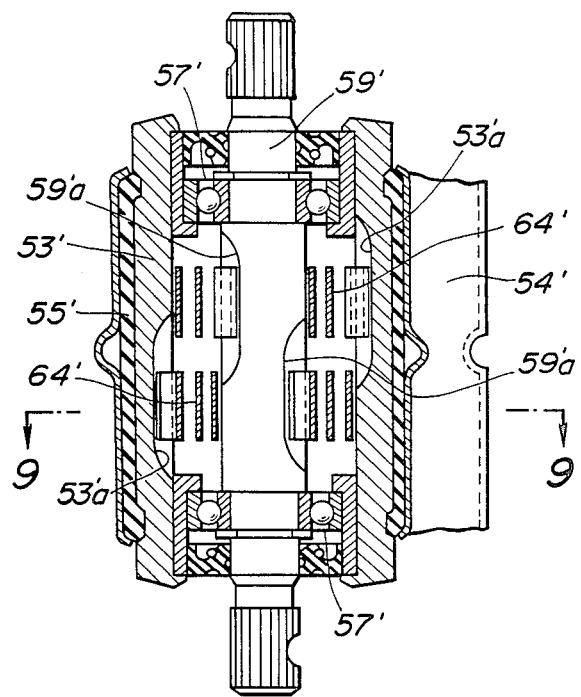
FIG. 8 is a sectional view of an alternative of the restoring mechanism unit of FIG. 7.
Figure 9:
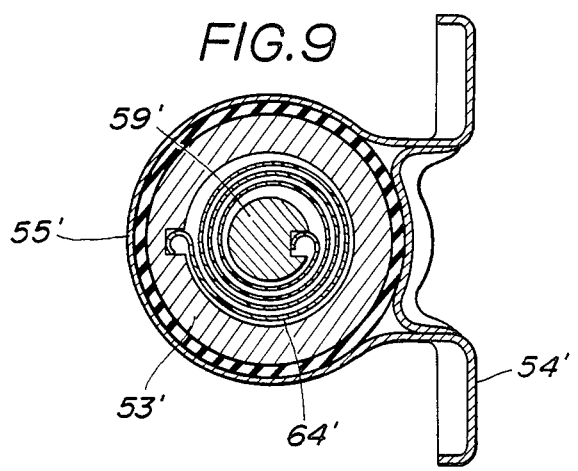
FIG. 9 is a cross-sectional view, showing the restoring mechanism unit of FIG. 8, taken along line 9—9 in FIG. 8.

FIGS. 8 and 9 show a modified restoring mechanism unit which may be used as an alternative to the restoring mechanism unit 51 of FIG. 7 described above. Similar or corresponding elements are designated by the corresponding reference numerals with apostrophes (') affixed, and only the significant differences between the units are described herein. In the modified unit, spiral springs 64' are used in place of the coil springs. A rotatable shaft 59' is provided with no collar and instead has a pair of axial grooves 59'a formed thereon. A casing 53' of a generally cylindrical shape has a pair of axial grooves 53'a at an inner surface thereof. Each spring 64' has one end engaging one of the grooves 59'a of the shaft and the other end engaging one of the grooves 53'a of the casing. When the shaft 59' is rotated from its neutral position, one of the springs 64' will be wound up while the other will be wound off, and both of the springs 64' then exert restoring torque to the shaft 59'.

FIGS. 10 and 11 show a rear steering gear used in a steering system of the third embodiment of the invention. The entire system of the third embodiment is the same as that of the first embodiment (see FIG. 1) except that the third embodiment has a front steering gear similar to gear 17a shown in FIG. 6, i.e., which is provided with no restoring mechanism, and a rear steering gear which instead is provided with a restoring mechanism. The entire system of this embodiment is not described in more detail herein.

As shown in FIG. 10, a rear steering gear 27' used in the third embodiment includes a gear box 71 mounted on the vehicle frame. The gear box 71 supports a rotatable input shaft 28' through bearings 75 and 76, supports an axially movable lateral rod 73 which extends horizontally and has respective ends connected with tie rods 33' (corresponding to the tie rods 33 in FIG. 1), and contains a mechanism for operatively connecting the input shaft 28' and the lateral rod 73 with each other. This mechanism is composed of elements including gears and cams, and is so arranged as to cooperate with the front steering gear to provide a steering operation mode wherein the rear wheels are steered in the same direction as the front wheels when the amount of rotation of the steering wheel from its neutral position is relatively small, and in the opposite direction to that of the front wheels when the amount of rotation of the steering wheel is relatively large. This mechanism in the rear steering gear 28' is essentially the same as one of those disclosed in Sano et al U.K. Patent Publication No. GB 2,161,437 A published on Jan. 15, 1986, and an artisan can make the rear steering gear of this embodiment based on the present disclosure together with the teachings of the British publication.

The rear steering gear 27' contains a restoring mechanism 81 which includes a cylinder 82 and a ring 83 both fitted over the input shaft 28'. As shown in FIGS. 10 and 11, the cylinder 82 has a radial projection 82a engaging a recess formed in the inner surface of the gear box 71 so as to prevent rotation of the cylinder 82 and an axial projection 82b engaging a cut-out 83a formed in the ring 83 so as to prevent rotation of the ring 83. The restoring mechanism 81 further includes a collar 85 secured on the input shaft 28' and having a pair of steps 85a and 85b on respective sides, and a pair of coil springs 86 disposed on respective sides of the collar 85 while being fitted over the input shaft 28'. One of the springs 86 has one end engaging a cut-out (unnumbered) formed in the front end (upper end in FIG. 10) of the cylinder 82 and the other end engaging the step 85a of the collar 85. The other of the springs 86 has one end engaging the cut-out 83a in the ring 83 and the other end engaging the step 85b of the collar 85.

The restoring mechanism 81 functions in the same manner as the restoring mechanism unit 51 of FIG. 7 used in the second embodiment. Additionally, by providing the restoring mechanism in the rear steering gear according to the third embodiment, the rear steering gear will be automatically held at its neutral position when it has been assembled and is not yet connected with other elements of the steering system, such as tie rods and the longitudinal shaft for connecting it with the front steering gear. This automatic centering provides convenience in mounting the rear steering gear on the vehicle frame and connecting the rear steering gear with the other elements, and is therefore advantageous in assembling the vehicle and in making a maintenance service of the vehicle.

Figure 12:
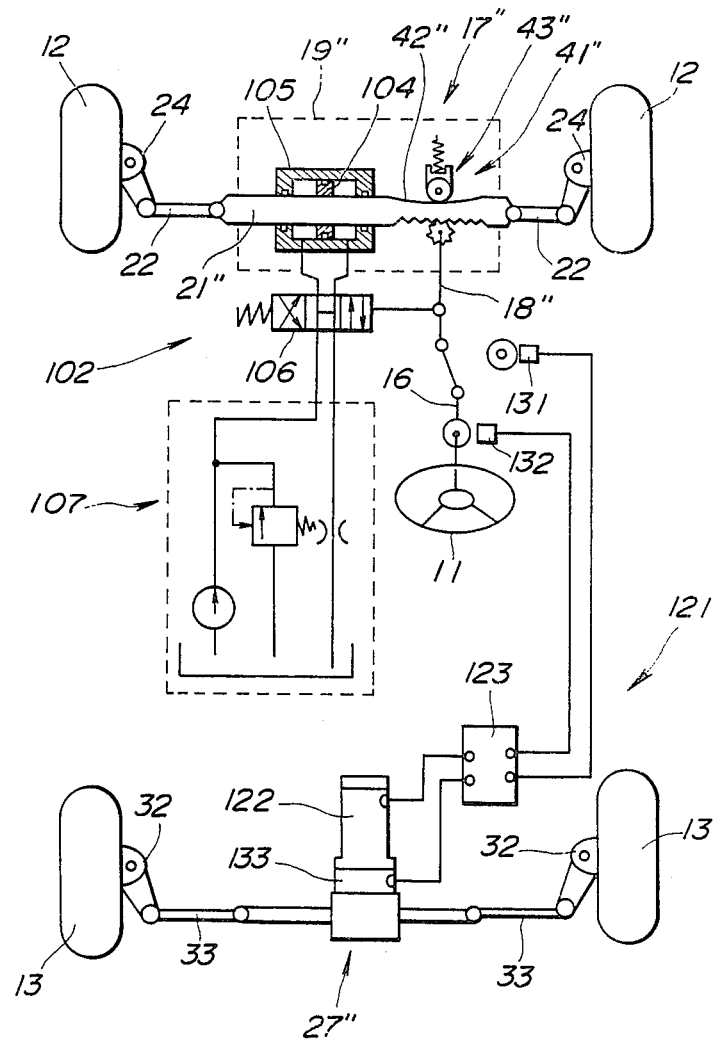
FIG. 12 is a simplified schematic plan view showing the entire steering system of a fourth embodiment of the invention.

FIG. 12 shows a steering system of the fourth embodiment of the invention. Some elements in this system are the same as those in the first embodiment as shown in FIG. 1. Such elements are designated by the corresponding reference numerals and are not described herein in detail. Further, similar elements are designated by the corresponding reference numerals with quotations (") affixed.

The steering system of the fourth embodiment includes a front steering gear 17" for the front wheels 12. The front steering gear 17" is of the rack-and-pinion type, and has gear box 19" as schematically illustrated in FIG. 12. A rack 21" of the front steering gear is operatively and mechanically connected to a steering wheel 11 through an input shaft 18", as well as to the front wheels 12 through tie rods 22 and steering knuckles 24. Further, the front steering gear 17" is equipped with a hydraulic power assist system 102 which comprises a power piston 104 fixed to the rack 21", a power cylinder 105 integrally formed with the gear box 19", a control valve 106 operatively connected with the input shaft 18" for controlling the flow of hydraulic oil to and from the power cylinder 105, and a hydraulic circuit 107 associated with the control valve 106. Various other types of conventional power assist systems may be used in this embodiment in place of this power assist system. The operations of hydraulic power assist systems are well known and therefore not described herein.

The steering system further includes a rear steering gear 27" for the rear wheels 13. The rear steering gear 27" has a rotatable input shaft (not shown) and connected with the rear wheels 13 through tie rods 33 and steering knuckles 32. Many types of conventional steering gears which have rotatable input shafts and can be connected with tie rods may be used for the system of this embodiment. The rear steering gear 27" is equipped with a servomechanism 121 which comprises an actuator 122 having an electric motor and a power source for the motor, an electronic controller 123 for the actuator 122, and sensors including a speed sensor 131, a front wheel angle sensor 132 and a rear wheel angle sensor 133. The speed sensor 131 has a conventional structure for generating outputs in response to the running speed of the vehicle. For example, a combination of a pulse generator associated with an axle of the vehicle to generate pulses in a rate corresponding to the rotational speed of the axle and an encoder for the pulses from the pulse generator, may be used for the speed sensor 131. The front wheel angle sensor 132 is attached to a steering shaft 16 of the steering gear so as to generate outputs in response to the angular position of the steering shaft 16, and thus of the steering wheel 11. Because the turning angle (steered angle) of the front wheels 12 depends on the angular position of the steering wheel 11, the outputs of this sensor correspond to the turning angle of the front wheels 12. Various conventional angular position sensors may be used for this purpose. The rear wheel angle sensor 133 is similar in structure as the front wheel angle sensor 132 and is attached to the input shaft of the rear steering gear 27". The outputs from these sensors 131, 132 and 133 are applied to the electronic controller 123.

The electronic controller 123 successively generates within itself signals representing desired turning angles of the rear wheels 13, referred to as DTA signals hereinafter. Each DTA signal depends on the latest outputs from the front wheel angle sensor 132 and the speed sensor 131. The outputs from the rear wheel angle sensor 133 represent actual turning angles of the rear wheels 13, and are thus referred to as ATA signals hereinafter. The controller 123 successively estimates the latest DTA signal and the latest ATA signal so as to output control signals for controlling the actuator 122 connected to the input shaft of the rear steering gear. Accordingly, the ATA signals from the rear wheel angle sensor 133 are applied to the controller 123 as feedback signals, and this forms a feedback roop for the servomechanism 121. The operation mode of the servomechanism 121 with this controller 123 is such that the turning angle of the rear wheels 13 is controlled based on the vehicle speed and the turning angle of the front wheels 12. More particularly, the rear wheels will be steered in the same direction as front wheels when the vehicle makes a turn at a relatively high speed, and in the opposite direction to that of the front wheels when the vehicle makes a turn at a relatively low speed.

There have been known various conventional control circuits for servomechanisms with feedback loops. Many of such circuits may be used for the aforementioned servomechanism of the fourth embodiment with minor and obvious modifications which are readily made by a person skilled in the field of control. Therefore, the details of the circuit for the controller 123 are not described herein.

It is noted that the steering wheel 11 is not mechanically connected with the rear wheels 13 in this embodiment, but the former is operatively connected with the latter by means of the servomechanism 121.

The front steering gear 17" described above is further provided with a restoring mechanism 41" which is similar in structure to the restoring mechanism 41 of FIGS. 2 and 3 used in the first embodiment. More particularly, the rack 21" of the front steering gear 17" has a single row of teeth which engages a pinion input shaft 18". The rack 21" has a concave cam surface 42" formed thereon at a position diametrically opposite to the row of teeth. A roller assembly 43", which is the same in structure and guided in the same manner as the assembly 43 of FIGS. 2 and 3, is provided in the gear box 19" and cooperating with the cam surface 42" so as to generate restoring force. The details of the restoring mechanism 41", as well as the functions, merits and advantages thereof, correspond to those of the restoring mechanism 41 in the first embodiment.

Regarding the first embodiment and the fourth embodiment, it is noted that, by the provision of the restoring mechanism disposed in and associated with the front steering gear in each of these embodiments, the front steering gear will be automatically held at its neutral position when it has been assembled and is not yet connected with other elements connected, such as tie rods and the steering shafts. This automatic centering provides convenience in mounting the front steering gear on the vehicle frame and connecting the front steering gear with the other elements and is, therefore, advantageous in assembling the vehicle and in servicing the vehicle, just as the third embodiment is so with respect to its rear steering gear.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative and not restrictive. The scope of the invention is indicated by the appended claims rather than by the foregoing description.

I claim:

1. A steering system for a vehicle having a steering wheel, steerable front wheels and steerable rear wheels, comprising:

linkage means mechanically interconnecting the steering wheel with the front and rear wheels for steering the front and rear wheels in response to operation of the steering wheel;

said linkage means including in a part thereof a front steering gear for the front wheels, a rear steering gear for the rear wheels and means for connecting said front and rear steering gears, said rear steering gear including an input means coupled with said means for connecting said front and rear steering gears and an output means coupled with said input means and causing turning movement of said steerable rear wheels; and restoring means for exerting restoring force to said linkage means so as to urge the steering wheel toward a neutral position thereof after every steering operation, said restoring means being disposed in one of said front steering gear, said means for connecting said front and rear steering gears, and said input means of said rear steering gear so that said restoring force is not applied to said output means of said rear steering gear during operation of said steering wheel.

2. A steering system according to claim 1, wherein:
   said front steering gear includes input means rotatable with said steering wheel, output means coupled with said input means and causing turning movement of said front wheels, and motion transmitting means coupled with said output means and said means for connecting said front and rear steering gears; and
   said restoring means comprises a restoring force exerting mechanism associated with one of said input means, said output means and said motion transmitting means so as to exert restoring force thereto.

3. A steering system according to claim 1, wherein:
   said means for connecting said front and rear steering gears comprises a plurality of elements connecting said front and rear steering gears; and
   said restoring means comprises a restoring force exerting mechanism associated with one of said elements so as to exert restoring force thereto.

4. A steering system according to claim 1, wherein:
   said rear steering gear further includes a rear gear box, and said input means comprising a shaft extending into said rear gear box; and
   said restoring means comprises a restoring force exerting mechanism mounted in said rear steering gear and associated with said shaft so as to exert restoring force thereto.

5. A steering system according to claim 1, wherein:
   said front steering gear includes elements constituting a transmission path of steering effort to the front wheels; and
   said restoring means comprises a restoring force exerting mechanism mounted in said front steering gear and associated with one of said elements so as to exert restoring force thereto.

6. A steering system according to claim 2, wherein:
   said restoring force exerting mechanism comprises a cam surface provided on one of said input means, said output means and said motion transmitting means, and a member urged to engage with said cam surface.

7. A steering system according to claim 6, wherein:
   said output means of said front steering gear comprises a rack; and said restoring force exerting mechanism comprises a concave cam surface formed on said rack and a roller assembly urged to engage said cam surface.

8. A steering system according to claim 7, wherein:
   said concave cam surface has a shape wherein the depth of said cam surface varies along the axial direction of said rack with its maximum depth at the center of said cam surface.

9. A steering system according to claim 6, wherein:
said motion transmitting means comprises a rotatable shaft; and said restoring force exerting mechanism comprises a peripheral cam surface of a heart-like shaped cam provided on said rotatable shaft, said peripheral cam surface having a recess thereon, and a slider slidable in the radial direction of said rotatable shaft and urged to engage said cam surface.

10. A steering system according to claim 9, wherein:
said recess on said peripheral cam surface is positioned just under said rotatable shaft when said front steering gear is at its neutral position.

11. A steering system according to claim 3, wherein:
said plurality of elements comprises a front shaft coupled with said front steering gear, a rear shaft coupled with said rear steering gear and an intermediate shaft interconnecting said front shaft and said rear shaft; and said restoring means includes a resilient means disposed on said intermediate shaft.

12. A steering system according to claim 11, wherein:
said resilient means comprises a pair of springs disposed around said intermediate shaft with first ends thereof engaging said intermediate shaft, either one of said pair of springs urging said intermediate shaft to rotate in one direction when said intermediate shaft is rotated in an opposite direction from its neutral position, and the other of said pair of springs urging said intermediate shaft to rotate in said opposite direction when said intermediate shaft is rotated in said one direction.

13. A steering system according to claim 12, wherein:
said resilient means comprises a pair of coil springs fitted over said intermediate shaft.

14. A steering system according to claim 12, wherein:
said resilient means comprises a pair of spiral springs fitted over said intermediate shaft.

15. A steering system according to claim 4, wherein:
said restoring means includes a resilient means disposed on said shaft.

16. A steering system according to claim 15, wherein:
said resilient means comprises a pair of springs disposed around said shaft with first ends thereof engaging said shaft, either one of said pair of springs urging said shaft to rotate in one direction when said shaft is rotated in an opposite direction from its neutral position, and the other of said pair of springs urging said shaft to rotate in said opposite direction when said shaft is rotated in said one direction.

17. A steering system for a vehicle comprising:
a steering wheel;
steerable front wheels;
steerable rear wheels;
linkage means mechanically interconnecting the steering wheel with said front wheels and including a front steering gear for said front wheels;
said front steering gear including input means coupled with said steering wheel and output means coupled with said input means and causing turning movement of said front wheels;
said steering wheel being operatively connected with said rear wheels; and
restoring means for exerting restoring force to said linkage means so as to urge said steering wheel toward a neutral position thereof, said restoring means being disposed in said front steering gear and comprising a cam surface provided on one of said input means and said output means, and a member urged to engage with said cam surface.

* * * * *

UNITED STATES PATENT AND TRADEMARK OFFICE
CERTIFICATE OF CORRECTION

PATENT NO. : 4,758,012
DATED : July 19, 1988
INVENTOR(S) : Ogura et al.

It is certified that error appears in the above-identified patent and that said Letters Patent is hereby corrected as shown below:

```
Column 3, line 18, change "of the " to --row of--;
          line 28, change "row" to --rows--;
          line 62, change "The" to --the--.
Column 8, line 45, change "as" to --to--;
          line 64, change "roop" to --loop--.
Column 9, line 23, after "pinion" insert --on the--;
Column 9, line 40, change "with other elements connected,
``` such as tie rods" to -- with other elements of the steering system, such as tie rods--.

Signed and Sealed this

Twentieth Day of December, 1988

Attest:

DONALD J. QUIGG

Attesting Officer

Commissioner of Patents and Trademarks